Patented Aug. 25, 1942

2,294,353

UNITED STATES PATENT OFFICE 2,294,353

PLASTICIZED POLYVINYL ACETAL RESIN

John M. De Bell, Longmeadow, and Elmer R. Derby, Springfield, Mass., assignors, by mesne assignments, to Monsanto Chemical Company, a corporation of Delaware No Drawing. Application November 2, 1937,
Serial No. 172,441

5 Claims. (Cl. 260—36)

Our present invention relates to plastic material to be employed as a sandwich material in the manufacture of laminated safety glass and the like. As is well known to those skilled in the art, polyvinyl acetal resin, i. e., a material made by condensing an aldehyde with a partially hydrolized polyvinyl acetate such as the resin described in the patent to Morrison et al., Reissue No. 20,430, dated June 29, 1937, appears to be an excellent, if not the best material, known for the purpose mentioned provided it is mixed with a satisfactory plasticizer, but its utilization has been retarded by the difficulty which has been experienced in discovering a plasticizer which will give to the final product all of the necessary properties.

These acetal resins vary in the degree of hydrolysis of the ester and the degree of combination of the aldehyde. For instance, the molecules of a satisfactory resin may be considered to be made of 82% acetal, 8% hydroxyl groups, calculated as polyvinyl alcohol, and 10% acetate by weight as analyzed. Another satisfactory resin contains 2% or less of acetate, 16 to 22% hydroxyl groups figured as alcohol and the balance acetal formed with butyraldehyde. The different resins of which the foregoing are only two examples have different properties according to the proportion of the three substituents mentioned and the particular aldehyde employed.

As explained in a companion application of Elmer R. Derby, Serial No. 172,443, filed November 2, 1937, plasticizers which are as near the point of incompatibility with a particular resin in the quantity employed are more effective to produce a satisfactory plastic. We have further discovered that, as explained in another application, Serial No. 172,442, filed November 2, 1937, that certain other plasticizers which are by themselves incompatible with a particular resin in effective quantities may be rendered compatible by the presence of small quantities of plasticizers which are miscible both with resin and with the immiscible or incompatible plasticizer; and that they unexpectedly produce excellent safety glass. Apparently the best results are produced with plasticizers which are normally incompatible provided they can be rendered compatible. Furthermore the different plasticizers have different effects on the final product, for instance increase in water resistance, solubility in the resin, adhesive strength at high or low temperatures, etc.

We have discovered that certain esters, conveniently called mixed molecule esters, are particularly useful for plasticization of these and similar resins, because it is possible to vary the chemical composition of the ester employed, and thereby to control the physical properties of the material produced when the mixed ester is combined with the polyvinyl acetal resin. By a mixed ester we mean a polyhydric alcohol or a polycarboxylic or a polybasic acid to which have been attached by esterification the radicals of two different substances. For instance, a dihydric alcohol may be combined on one side with one acid radical and on the other side with another acid radical, or a trihydric alcohol may be combined with three different acid radicals or two of one kind and one of another. Likewise a polycarboxylic acid may be combined with different monohydric alcohols. The above description is used merely as illustration as other combinations will be readily apparent to those skilled in the art. We have discovered that by employing these mixed molecule esters, it is possible to employ a plasticizer which, in the proportions used, is just below the point of incompatibility with the particular resin employed, and thus obtain desirable physical properties in the safety glass.

In making up a suitable plasticizer the component elements of the mixed molecule ester are chosen with particular regard for their effects on the plasticized mixture. For instance, we have discovered that the presence of a radical of butyric or phthalic acid improves the water resistance while the radical of propionic acid improves the mutual solubility of the mixed molecule ester and the resin. In preparing these mixed molecule esters care will be taken to keep the molecular proportions of the component materials such that resinification will not take place in the ester itself. For instance in making a mixed molecule ester of diglycol-propionate phthalate the propionate will be in excess of the phthalate.

The following are specific examples of mixtures embodying our invention:

1

|  | Parts |
|---|---|
| Formaldehyde resin as above described | 100 |
| Diethylene glycol propionate butyrate | 60 |

Diethylene glycol dibutyrate used in these proportions is oily and immiscible, while diethylene glycol propionate though excellently miscible has poor water resistance.

2

|  | Parts |
|---|---|
| The same resin as Example 1 | 100 |
| Diethylene glycol propionate phthalate | 60 |

Diethylene glycol phthalate is a balsam-like resin.

3

| | Parts |
|---|---|
| Butyraldehyde resin as described above | 100 |
| N-butyl-iso butyl phthalate | 90 |

Di-N-butyl phthalate when used in these proportions gives a soft plastic which has poor impact strength at 120° F.

Di-isobutyl phthalate gives poor cold and hot break in these proportions.

4

| | Parts |
|---|---|
| The same resin as Example 3 | 100 |
| Butyl-hexyl phthalate | 80 |

Dihexyl phthalate gives an oily product when used in these proportions.

5

| | Parts |
|---|---|
| The same resin as for Example 3 | 100 |
| Diglycol laurate acetate | 50 |

When used in laminated glass each of the materials produced in accordance with the foregoing examples give substantially equal hot and cold break tests.

We have pointed out that in the case of resin-forming constituents, such as poly-hydric alcohols and poly-basic acids in the same molecule, care must be taken to keep one of the constituents low in order to avoid resin formation, unless this is wished for. Obviously, when a neutral ester of a di-hydric alcohol is made with two acidic constituents, the acidic constituents must be present in exactly chemical equivalent proportions in order to make the mixed molecule ester. Where, in the preparation of the mixed molecule ester it is desirable to use other than the exact chemical equivalent of two alcohols or two acids, it is obvious that the resulting reaction product will consist of a mixture of the mixed molecule ester and the unmixed ester of the constituent in excess. In these cases, the resulting plasticizer should be used as a mixture of the mixed molecule ester and the unmixed ester. In cases where the two acids or alcohols are used in equivalence, there will also be present unmixed esters to satisfy equilibrium conditions; these may either be removed by appropriate fractionation, or in some cases may be left in the plasticizer.

We claim:

1. A composition of matter for interleaf material for laminated safety glass which comprises polyvinyl acetal resin made with formaldehyde and having proportions of about 8% hydroxyl groups calculated as polyvinyl alcohol, 10% acetate and 82% acetal and plasticized with a mixed molecule ester of diglycol propionate phthalate, said ester being in the proportion of 60 parts to each 100 parts of the resin, and the propionate being in chemical equivalent in excess over the phthalate said composition of matter when so used giving substantially equal hot and cold break tests.

2. A composition of matter for interleaf material for laminated safety glass which comprises polyvinyl acetal resin made with formaldehyde and having proportions of about 8% hydroxyl groups calculated as polyvinyl alcohol, 10% acetate and 82% acetal and plasticized with a mixed molecule ester of diglycol propionate phthalate, said ester being in the proportion of 60 parts to each 100 parts of the resin, and the phthalate being not over ⅓ the acid equivalent of the propionate said composition of matter when so used giving substantially equal hot and cold break tests.

3. A polyvinyl acetal resin plasticized with diglycol propionate phthalate.

4. A polyvinyl acetal resin made with formaldehyde and plasticized with diglycol propionate phthalate.

5. A polyvinyl acetal resin made with formaldehyde and plasticized with substantially 60 parts of diglycol propionate phthalate for each 100 parts of resin.

JOHN M. DE BELL.
ELMER R. DERBY.